US009207123B2

(12) United States Patent
Jones

(10) Patent No.: US 9,207,123 B2
(45) Date of Patent: Dec. 8, 2015

(54) ATHERMAL CHANNELED SPECTROPOLARIMETER

(71) Applicant: Sandia Corporation, Albuquerque, NM (US)

(72) Inventor: Julia Craven Jones, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/192,543

(22) Filed: Feb. 27, 2014

(65) Prior Publication Data

US 2014/0247449 A1  Sep. 4, 2014

Related U.S. Application Data

(60) Provisional application No. 61/771,273, filed on Mar. 1, 2013.

(51) Int. Cl.
    *G01J 3/447* (2006.01)
    *G01J 3/02* (2006.01)
(52) U.S. Cl.
    CPC ............ *G01J 3/447* (2013.01); *G01J 3/0286* (2013.01); *G01J 3/02* (2013.01)
(58) Field of Classification Search
    CPC ............ G01J 3/02; G01J 3/08; G01J 3/10; G01J 3/18; G01J 3/50; G01J 3/2803; G01J 3/2823; G01J 3/28
    USPC .................................. 356/300–334
    See application file for complete search history.

(56) References Cited

U.S. PATENT DOCUMENTS

| 4,456,339 A * | 6/1984 | Sommargren | 356/513 |
| 6,421,131 B1* | 7/2002 | Miller | 356/453 |
| 2003/0007151 A1* | 1/2003 | Eckert | 356/369 |

OTHER PUBLICATIONS

Ebbers, "Thermally Insensitive, Single-Crystal, Biaxial Electro-Optic Modulators", J. Opt. Socl Am. B/vol. 12, No. 6, Jun. 1995, pp. 1012-1020.
Oka, et al., "Spectroscopic Polarimetery with a Channeled Spectrum", Optics Letters, vol. 24, No. 21, Nov. 1, 1999, pp. 1475-1477.
Craven-Jones, et al., "Infrared Hyperspectral Imaging Polarimeter Using Birefringent Prisms", Applied Optics, vol. 50, No. 8, Mar. 10, 2011, pp. 1170-1185.
Snik, et al., "Spectral Modulation for Full Linear Polarimetry", Applied Optics, vol. 48, No. 7, Mar. 1, 2009, pp. 1337-1346.
Sabatke, et al., "Snapshot Imaging Spectropolarimeter", Opt. Eng. vol. 41, No. 5, May 2002, pp. 1048-1054.
Taniguchi, et al., "Stabilization of a Channeled Spectropolarimeter by Self-Calibration", Optics Letters, vol. 31, No. 22, Nov. 15, 2006, pp. 3279-3281.

(Continued)

*Primary Examiner* — Abdullahi Nur
(74) *Attorney, Agent, or Firm* — Michael A. Beckett

(57) ABSTRACT

A temperature insensitive (athermal) channeled spectropolarimeter (CSP) is described. The athermal CSP includes a crystal retarder formed of a biaxial crystal. The crystal retarder has three crystal axes, wherein each axis has its own distinct index of refraction. The axes are oriented in a particular manner, causing an amplitude modulating carrier frequency induced by the crystal retarder to be thermally invariant. Accordingly, a calibration beam technique can be used over a relatively wide range of ambient temperatures, with a common calibration data set.

18 Claims, 7 Drawing Sheets

(56) References Cited

OTHER PUBLICATIONS

Jones, et al., "Realization of Quantitative-Grade Fieldable Snapshot Imaging Spectropolarimeter", Optics Express, vol. 12, No. 26, Dec. 27, 2004, 15 Pages.

Kudenov, et al., "Fourier Transform Channeled Spectropolarimetry in the MWIR", Optics Express, vol. 15, No. 20, Sep. 14, 2007, 14 Pages.

Nordsieck, "A Simple Polarimetric System for the Lick Observatory Image-Tuber Scanner", Pub. Astron. Soc. Pacific, vol. 86, Jun. 1974, pp. 324-329.

* cited by examiner

ATHERMAL CHANNELED SPECTROPOLARIMETER

RELATED APPLICATION

This application claims priority to U.S. Provisional Patent Application No. 61/771,273, filed on Mar. 1, 2013, and entitled "THERMALLY STABLED CHANNELED SPECTROPOLARIMETRY", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Channeled spectropolarimetry refers to analysis of polarization states of an electromagnetic (EM) signal as a function of respective wavelengths of the EM signal. A conventional channeled spectropolarimeter (CSP) comprises a plurality of crystal retarders, which are typically composed of a uniaxial crystal, such as calcite or quartz (e.g., for the visible near infrared (VISNIR) spectrum). Other exemplary uniaxial crystals include cadmium sulfide and cadmium selenide (e.g., for the thermal infrared spectrum (LWIR)). These uniaxial crystals have two distinct indices of refraction corresponding to two separate crystal axes (e.g., a fast axis and a slow axis) in the uniaxial crystal, wherein the crystal axes are orthogonal to one another.

The crystal retarders are typically designed for a particular application, such as characterization of a particular object, discriminating between objects (e.g., man-made or natural), etc. Thicknesses of crystal retarders in a conventional CSP are selected based upon desired amplitude modulating carrier frequencies respectively induced by the crystal retarders in an EM signal being analyzed. Orientations of the crystal retarders (relative to one another) are selected based upon polarization states that are modulated onto the EM signal passing through the crystal retarder. Thus, a crystal retarder in a CSP amplitude modulates the frequency spectrum of the EM signal passing therethrough with a particular carrier frequency and certain polarization states. The amplitude modulating carrier frequency is based upon a thickness of the crystal retarder, and the orientation of the fast axis and the slow axis in the crystal retarder relative to the transmission axis of the EM signal define the polarization states that are amplitude modulated onto a frequency spectrum of the EM signal. Accordingly, to obtain an accurate measurement for the frequency spectrum of the EM signal that is subject to analysis, crystal retarders in a CSP must have a relatively precise orientation.

A primary limitation of conventional channeled CSP is related to the sensitivity of the crystal retarders to temperature. With more particularity, a conventional CSP includes two uniaxial crystal retarders arranged optically in series with one another and oriented in a particular manner relative to one another. In such a conventional configuration, the crystal retarders act to amplitude modulate the desirably measured frequency spectrum with carrier frequencies that comprise the spectrally-dependent Stokes parameters $S_1$, $S_2$, and $S_3$. Using a particular configuration, intensity measured by the spectrometer of the CSP is as follows:

$$I(\sigma) = \frac{1}{2}\begin{bmatrix} S_0(\sigma) + S_1(\sigma)\cos(\phi_2) + \\ S_2(\sigma)\sin(\phi_1)\sin(\phi_2) + S_3(\sigma)\cos(\phi_1)\sin(\phi_2) \end{bmatrix}. \quad (1)$$

In Eq. 1, $\phi_i(\sigma)=2\pi\sigma Bl_i$ is the phase difference introduced by the $i^{th}$ retarder, $B=|n_1-n_2|$ is the birefringence of the uniaxial crystal, $l_i$ is the crystal retarder thickness, and $\sigma=1/\lambda$. To recover the state of polarization (SOP) information based upon the output of the spectrometer, Stokes information must be separated from the phase information associated with the modulating carrier frequencies ($\phi_1$ and $\phi_2$), which are produced by the crystal retarders of the CSP. One technique used to accomplish this involves acquiring a reference measurement using a known SOP, thereby allowing for the phase terms to be characterized. This approach for obtaining a measurement using a CSP can be referred to as the reference beam calibration technique.

A limitation of conventional CSPs and the reference beam calibration technique relates to the temperature sensitivity of the crystal retarders. With more specificity, when sample data is acquired at a temperature that is different from the temperature when the calibration data was acquired, calibration errors are introduced into the resultant measurement. Temperature change produces a variation in thickness and dispersion of the birefringent retarder elements, resulting in a change in the carrier frequencies in the modulated spectral measurements. The change in phase of the $i^{th}$ retarder for a change of temperature $\Delta T$ is given by the following algorithm:

$$\Delta\phi_i \approx 2\pi\sigma l_i \Delta T\left[B(\sigma)\gamma_L\left(\frac{\partial n_1}{\partial T} - \frac{\partial n_2}{\partial T}\right)\right], \quad (2)$$

where $\gamma_L=(1/l_i)(\partial l_i/\partial T)$ is the coefficient of linear thermal expansion along the propagation direction of the EM signal.

Eq. (2) implies that when the calibration data is applied after the instrument experiences a change in temperature, the carrier frequency phases are not effectively compensated. This produces calibration errors in the polarization data products. To avoid these calibration errors, calibration data must be taken frequently, or precise thermal stability of the system must be maintained actively. For many CSPs, such as those that are field deployed, these solutions complicate system operation significantly.

SUMMARY

The following is a brief summary of subject matter that is described in greater detail herein. This summary is not intended to be limiting as to the scope of the claims.

Described herein are various technologies pertaining to a temperature insensitive (athermal) channeled spectropolarimeter (CSP). The athermal CSP comprises a crystal retarder that is composed of a biaxial crystal, wherein the biaxial crystal has three crystal axes that respectively have three distinct indices of refraction. In an exemplary embodiment, the biaxial crystal can be potassium titanyl phosphate ($KTiOPO_4$). The three crystal axes of the biaxial crystal are configured in the athermal CSP to have a particular orientation relative to the transmission axis of an electromagnetic (EM) signal that is subject to analysis. In another exemplary embodiment, the athermal CSP can comprise multiple crystal retarders, each being composed of the biaxial crystal. The crystal axes of the respective crystal retarders can be oriented relative to one another based upon polarization states that are to be analyzed. The athermal CSP further comprises a polarizer, wherein the polarizer is positioned optically in series with the crystal retarder or retarders, and is configured to allow EM waves that have a particular polarization direction to pass therethrough. Pursuant to an exemplary embodiment, the polarizer can be configured such that its transmission axis is parallel to one of the crystal axes of the crystal retarder in the athermal CSP.

The athermal CSP further comprises a spectrometer that is positioned in optical communication with the polarizer (e.g., by way of a fiber optic cable, or optically in series), wherein the spectrometer can be a dispersive spectrometer or a Fourier spectrometer. The output of the spectrometer is a signal that is indicative of polarization states of EM waves (of the EM signal) that are subject to analysis. As indicated above, the athermal CSP is temperature invariant, as changes in temperature do not significantly impact the amplitude modulating carrier frequencies induced by the crystal retarder when an EM signal passes therethrough. Therefore, for example, a set of calibration data can be obtained in a laboratory environment, and the same calibration data can be employed when the athermal CSP is used in the field to obtain measurements pertaining to an object of interest, regardless of whether there is a change in temperature between when the calibration data was generated and when the measurements in the field are obtained.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
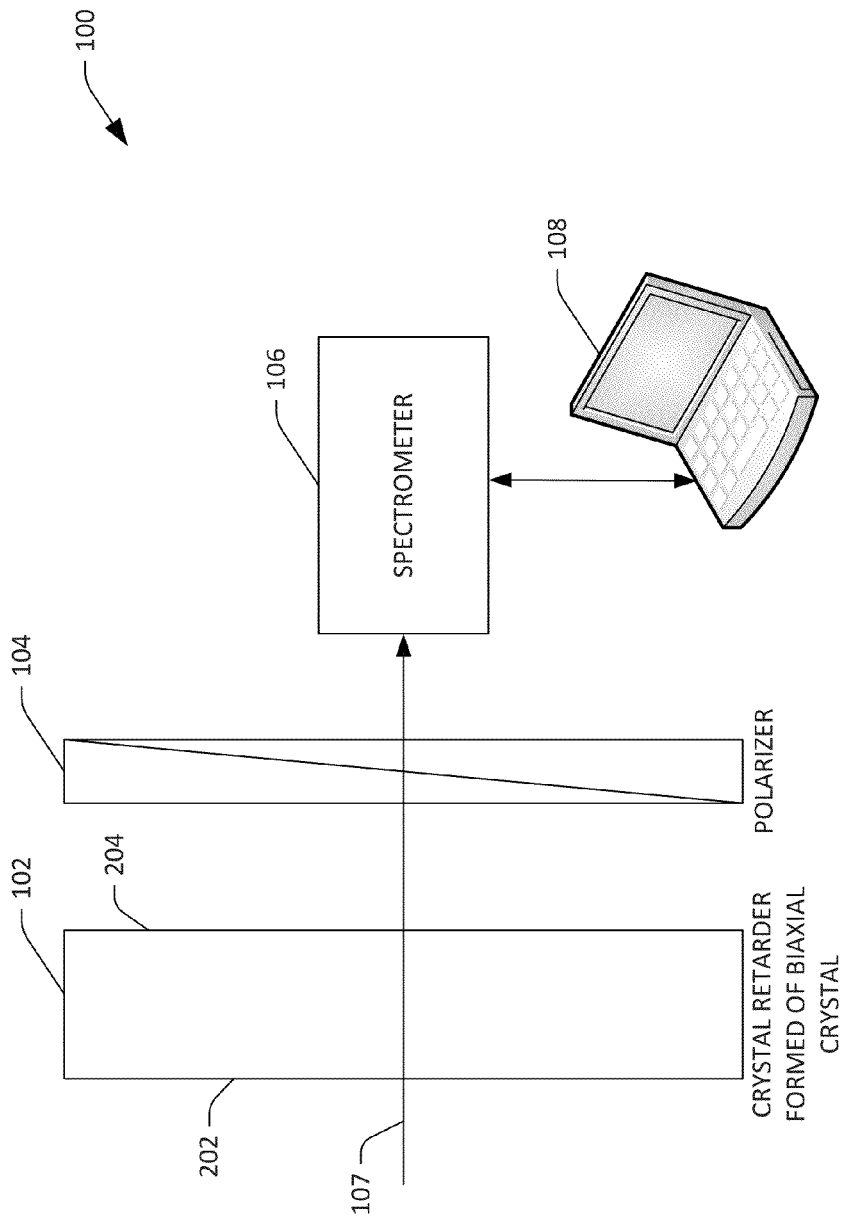
FIG. 1 illustrates an exemplary athermal channeled spectropolarimeter (CSP).

Various technologies pertaining to an athermal spectropolarimeter (CSP) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

A CSP measures the polarization state of light (e.g., visible, near infrared, infrared, . . . ) as a function of wavelength. Described herein are technologies pertaining to the use of crystal retarders formed of a biaxial crystal in a CSP, wherein the crystal retarders are manufactured and oriented in the CSP such that respective amplitude modulating carrier frequencies induced in an EM signal that passes through the crystal retarder are temperature invariant. This results in the CSP being temperature insensitive, or athermalized.

With reference now to FIG. 1, an exemplary athermal CSP 100 is illustrated. The athermal CSP 100 comprises a crystal retarder 102 that is formed of a biaxial crystal. In an exemplary embodiment, the biaxial crystal can be potassium titanyl phosphate ($KTiOPO_4$). In another example, the biaxial crystal can be $KNbO_3$. As will be shown and described in greater detail herein, the crystal retarder 102 comprises three crystal axes, each with a respective distinct index of refraction corresponding thereto. Thus, the crystal retarder 102 comprises: 1) a first crystal axis A that has a first index of refraction $n_A$; 2) a second crystal axis B that has a second index of refraction $n_B$; and 3) a third crystal axis C that has a third index of refraction $n_C$. The three crystal axes are each orthogonal to one another. In an exemplary embodiment, $n_A < n_B < n_C$.

The athermal CSP 100 further includes a polarizer 104 that is positioned optically in series with the crystal retarder 102. With more particularity, a transmission axis 107 of an EM signal that is to be measured passes through the crystal retarder 102 and the polarizer 104. The polarizer 104 is configured to allow electromagnetic (EM) waves that have a particular polarization direction to pass therethrough. In an example, the polarizer 104 is oriented relative to the crystal retarder 102 such that the polarization direction referenced above is angularly offset by 45° the second crystal axis of the crystal retarder 102.

The athermal CSP 100 further comprises a spectrometer 106 that is in optical communication with the polarizer 104, such that EM waves that pass through the polarizer 104 are received by the spectrometer 106. For instance, EM waves passing through the polarizer 104 can be directed to a fiber-optic cable (not shown), and directed to the spectrometer 106. The spectrometer 106 can be, for example, a dispersive spectrometer, a Fourier spectrometer, or other suitable type of spectrometer. Generally, the spectrometer 106 is configured to output a signal that is indicative of polarization states of an EM signal being measured as a function of wavelengths of the EM signal.

A computing device 108 can be in communication with the spectrometer 106. For example, the computing device 108 can receive the signal output by the spectrometer 106, and can characterize an object (or discriminate the object) from which the EM signal originates based upon the signal output by the spectrometer.

Figure 2:
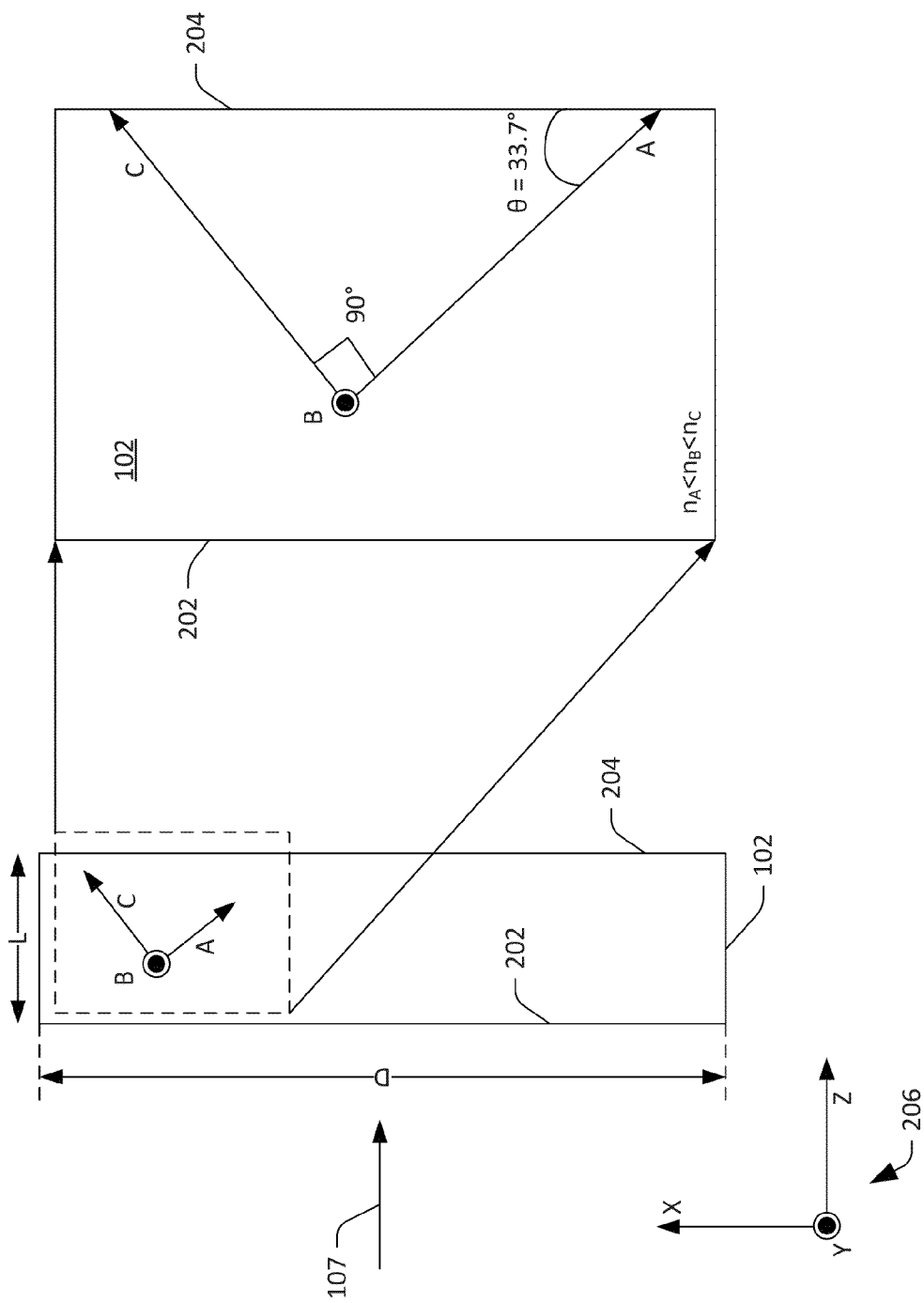
FIG. 2 illustrates orientation of crystal axes in a $KTiOPO_4$ crystal retarder composed of a biaxial crystal relative to a global coordinate system.

Referring to FIG. 2, an exemplary orientation of the three crystal axes A, B, and C of the crystal retarder 102 in the athermal CSP 100 is depicted, wherein the crystal retarder is composed of $KTiOPO_4$ (e.g., and configured to use in analyzing visible and near infrared wavelengths). As shown, the crystal retarder 102 comprises a proximal surface 202 and a distal surface 204, wherein the surfaces 202 and 204 are circular in shape (e.g., the crystal retarder 102 is cylindrical). Thus, the proximal surface 202 is parallel with the distal surface 204 of the crystal retarder 102, and the proximal surface 202 and the distal surface 204 are parallel to the X-axis of a global coordinate system (represented by global coordinate system axes 206). Further, the proximal surface 202 and the distal surface 204 are orthogonal to the transmission axis 107 of the EM signal, where the transmission axis 107 is parallel to the Z axis of the global coordinate system.

The crystal retarder 102 has a thickness l and a height d. Pursuant to an example, the thickness l of the crystal retarder 102 can be between 0.1 mm and 30 mm. It is to be ascertained, however, that the thickness is dependent on the crystal material used and is selected as a function of a desired amplitude modulating carrier frequency induced in an EM signal that is directed to the crystal retarder 102.

As indicated above, the crystal retarder 102 comprises the three crystal axes A, B, and C, wherein the first crystal axis A has an index of refraction $n_A$, the second crystal axis B has an index of refraction $n_B$, and the third crystal axis C has an index of refraction $n_C$. In an exemplary embodiment, the first crystal axis A forms an angle θ with the distal surface 204 (and the proximal surface 202) of the crystal retarder 102, wherein θ is approximately 33.7°. The second crystal axis B, in this example, is orthogonal to the first crystal axis A, and is parallel with the Y-axis of the global coordinate system (and therefore is also parallel to the proximal surface 202 and the distal surface 204 of the crystal retarder 102). In another example, the second crystal axis B can be angularly offset from the Y axis by 45°. The third crystal axis C is orthogonal to axes A and C. Further, as presented above, $n_A < n_B < n_C$.

While FIG. 2 illustrates a particular orientation when the crystal retarder 102 is composed of $KTiOPO_4$, it is to be understood that other orientations can be used when the crystal retarder 102 is composed of other materials and/or configured to analyze different wavelengths. An exemplary algorithm that can be employed to determine θ generally is set forth in Ebbers, "Thermally Insensitive, Single-Crystal, Biaxial Electro-Optic Modulators", J. Opt. Soc. Am. B/Vol. 12, No. 6, June 1995, Pages 1012-1020, the entirety of which is incorporated herein by reference.

Returning to FIG. 1, operation of the athermal CSP 100 is now described. Initially, an EM signal that is subject to measurement is received. The EM signal can be emitted from an object or can be reflected from an object. The EM signal travels along the transmission axis 107, wherein the transmission axis 107 is orthogonal to the proximal surface 202 and the distal surface 204 of the crystal retarder 102. The crystal retarder 102, oriented as depicted in FIG. 2, induces an amplitude modulating carrier frequency in the EM signal passing therethrough, where the carrier frequency is dependent upon the thickness l of the crystal retarder 102. Thus, a modulated EM signal exits the crystal retarder 102, where polarization states modulated on frequencies in the frequency spectrum of the modulated EM signal are based upon the orientation of the crystal axes A, B, and C and their respective indices of refraction.

The modulated EM signal exiting the crystal retarder 102 continues to travel along the transmission axis 107 and reaches the polarizer 104. The polarizer 104 is oriented to allow EM waves to pass therethrough that have a particular polarization direction. For example, the polarizer 104 can be oriented such that an EM signal exiting the polarizer 104 comprises (only) waves having a polarization direction that is parallel to the B axis of the crystal retarder 102. In another example, the polarizer 104 can be oriented such that an EM signal exiting the polarizer 104 comprises (only) waves having a polarization direction that is angularly offset by 45° in the X-Y plane from the B axis of the crystal retarder 102. The output of the polarizer 104 can be referred to as a polarized EM signal. The spectrometer 106 receives the polarized EM signal that exits the polarizer 104. The spectrometer 106 outputs a signal that is indicative of polarization states of the (original) EM signal as a function of frequencies in the frequency spectrum of the EM signal. The output of the spectrometer 106 can be analogized to a human fingerprint, such that the polarization states, as a function of frequency, can be indicative of an identity of an object, a class of an object (e.g., man-made or natural), etc.

In an exemplary embodiment, the athermal CSP 100 shown in FIG. 1 can be deployed in a remote sensing application, where the athermal CSP 100 may be exposed to a relatively wide range of temperatures. When the crystal retarder 102 is oriented relative to the transmission axis 107 and the indices of refraction are defined as shown in FIG. 2, the crystal retarder 102 is relatively thermally invariant. That is, the amplitude modulating carrier frequencies induced by the crystal retarder 102 are stable over a relatively large temperature range of the crystal retarder 102 (e.g., 75° C.). Additionally, the athermal CSP 100 can be a point source athermal CSP, or may be configured to output a signal that is indicative of polarization states with respect to frequencies of an EM signal pertaining to a larger scene. In either case, the athermal CSP 100 may further include an optics element (e.g., a collimator or other suitable lens) that is configured to direct EM signal(s) along the transmission path 107.

Still more particular detail relating to the athermal CSP 100 is now set forth. In the athermal CSP 100, the frequency spectrum of the EM signal is amplitude modulated with carrier frequencies that include the spectrally dependent $S_1$ and $S_3$ Stokes parameters. When the athermal CSP 100 is modified to include a second crystal retarder (e.g., positioned between the crystal retarder 102 and the polarizer 104), and the second axis of the second crystal retarder (e.g., B' axis) is angularly offset from the B axis of the crystal retarder 102 by 45° in the X-Y plane, the frequency spectrum of the EM signal subject to measurement can be amplitude-modulated with carrier frequencies that comprise the spectrally dependent $S_1$, $S_2$, and $S_3$ Stokes parameters. In such a configuration, the intensity measured by the spectrometer 106 can be as set forth in Eq. (1). Using a calibration data set, the Stokes information can be separated from the phase information associated with the modulating carrier frequencies induced by the crystal retarder 102 and the second crystal retarder. Moreover, the calibration data set can be used over a range of temperatures, as the athermal CSP 100 is thermally insensitive (e.g., due to the crystal retarders being thermally insensitive). Accordingly, the reference beam calibration technique can be used without the need for frequent recalibration. The crystal retarder 102 is temperature insensitive due to the three distinct indices of refraction in the biaxial crystal from which the crystal retarder 102 is formed.

When the athermal CSP 100 includes a single crystal retarder (the crystal retarder 102), the athermal CSP 100 is capable of measuring $S_1$ and $S_3$. In another exemplary embodiment, the athermal CSP 100 can be configured to measure $S_2$ and $S_3$. In still yet another exemplary embodiment, a quarter wave plate can be added when the CSP includes the single crystal retarder, in which case the athermal CSP 100 can be configured to measure $S_1$ and $S_2$. The intensity I is given by Eq. (1), where ($\phi_1$=0 and $\phi_2(\sigma)$=$2\pi\sigma(n_B-n_{AC})$l is the phase difference introduced by the crystal retarder 102. Accordingly, $S_1$ and $S_3$ are modulated by the same carrier frequency, but can be separated due to the $\pi/2$ phase shift. The index of refraction $n_{AC}$ is the index of refraction in the AC plane (perpendicular to $n_B$), and is given as follows:

$$n_{AC} = \frac{n_A n_C}{\sqrt{n_A^2 \sin^2(\theta) + n_C^2 \cos^2(\theta)}} \quad (3)$$

In Eq. (3), $\theta$ is defined relative to the distal surface 204 of the crystal retarder 102. In experiments, the optical path difference (OPD) introduced by the crystal retarder 102 when oriented as shown in FIG. 2 was found to be approximately 97 μm at $\lambda$=700 nm, with $n_{AC}$=1.785, $n_B$=1.764, and l=4.75 mm.

Figure 3:
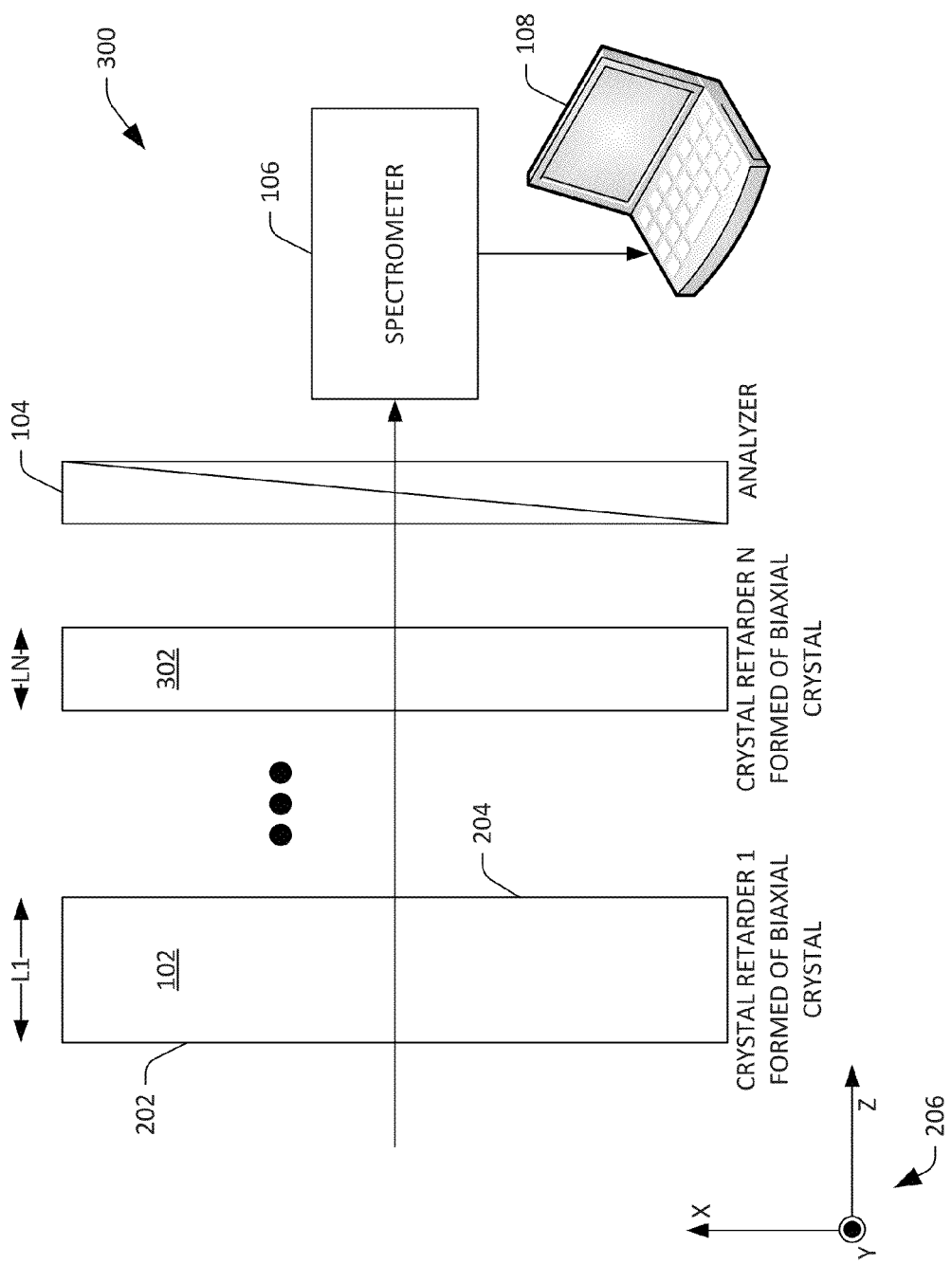
FIG. 3 illustrates another exemplary athermal CSP.

Now referring to FIG. 3, another exemplary athermal CSP 300 is illustrated. The athermal CSP 300 includes the crystal retarder 102, the polarizer 104, the spectrometer 106, and the computing device 108. In this example, the athermal CSP 300 also includes at least one other (cylindrical) crystal retarder 302 (crystal retarder N). In an exemplary embodiment, the crystal retarder 302 can also be composed of the biaxial crystal referenced above, and can have three crystal axes (A', B', and C') that respectively correspond to the crystal axes of the first crystal retarder 102. In an exemplary embodiment, the Nth crystal retarder 302 can be rotated counter clockwise or clockwise about the Z-axis, such that the second crystal axis (B') of the Nth crystal retarder 302 is angularly offset from the second crystal axis (B axis) of the crystal retarder 102. In such a configuration, the A' axis of the Nth crystal retarder 302 forms an angle with the circular face of the Nth crystal retarder 302 that is determined as a function of material of the Nth crystal retarder and the spectrum that is being analyzed. For instance, with respect to a crystal retarder composed of $KTiOPO_4$, where the athermal CSP 100 is configured to analyze the visible and near infrared spectrum, such angle can be approximately 33.7°. Pursuant to an example, the angular offset between the B axis of the first crystal retarder 102 and the B' axis of the Nth crystal retarder 302 can be 45°. Further, the indices of refraction of the three crystal axes of the Nth crystal retarder can be equivalent to $n_A$, $n_B$, and $n_C$. In another example, the indices of refraction of the three crystal axes of the Nth crystal retarder can be different from those of the crystal retarder 102; however, in either case, $n_A < n_B < n_C$. It is to be understood that the athermal CSP 100 can include more than two crystal retarders, wherein the crystal retarders are oriented relative to one another in the X-Y plane such that their respective second axes (B axes) are angularly offset from one another. Furthermore, thicknesses of crystal retarders in the athermal CSP can be different from one another. Thus, for instance, the thickness $l_1$ of the crystal retarder 102 can be larger (or smaller) than the thickness $l_N$ of the Nth crystal retarder 302.

Figure 4:
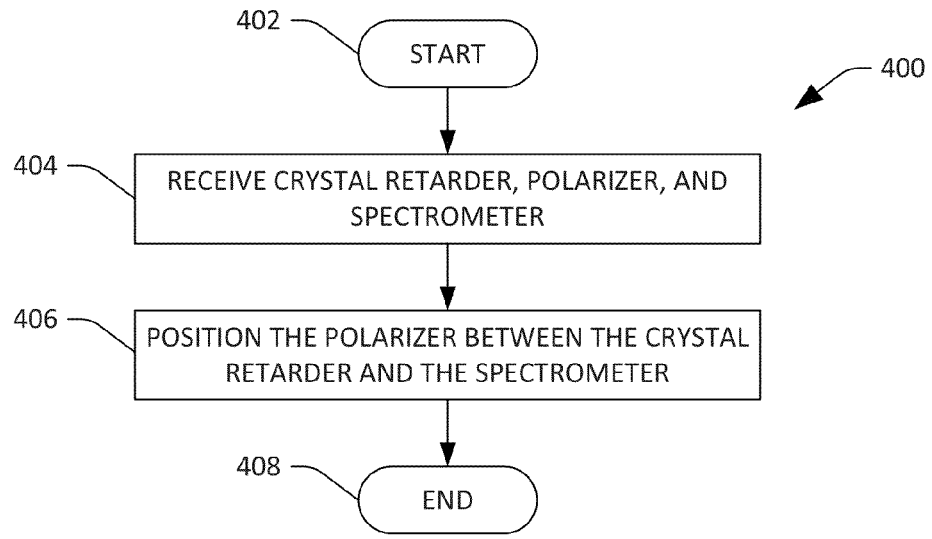
FIG. 4 is a flow diagram illustrating an exemplary methodology for forming an athermal CSP.
Figure 5:
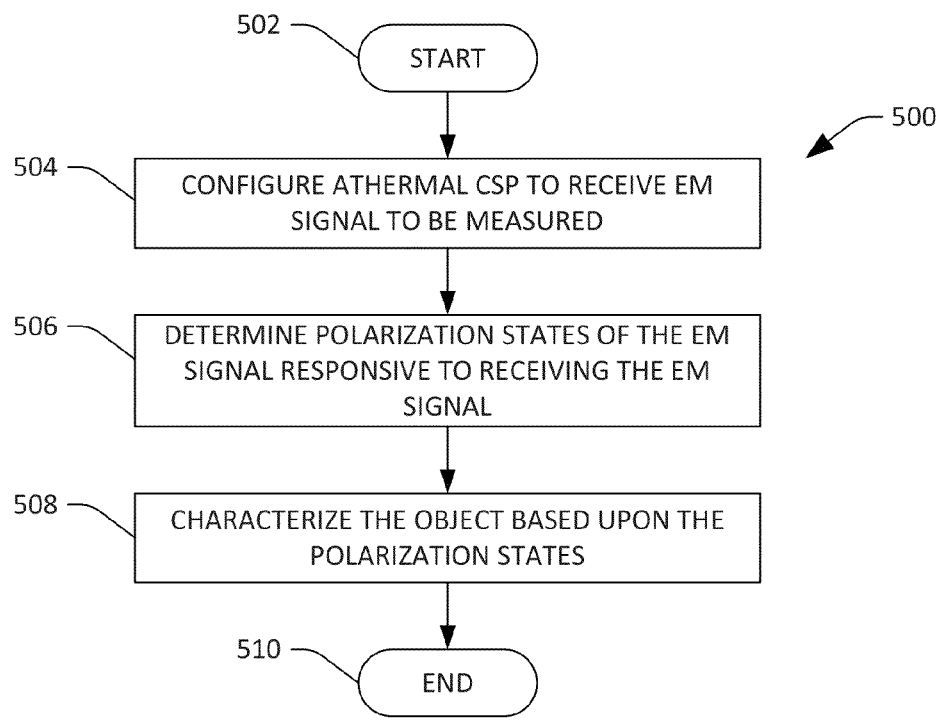
FIG. 5 is a flow diagram that illustrates an exemplary methodology for characterizing an object through use of an athermal CSP.

FIGS. 4-5 illustrate exemplary methodologies relating to forming and using an athermal CSP. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Turning now to FIG. 4, an exemplary methodology 400 for forming an athermal CSP is illustrated. The methodology 400 starts at 402, and at 404, a crystal retarder (or several crystal retarders), a polarizer, and a spectrometer are received. The crystal retarder(s), as described above, is composed of a biaxial crystal that comprises three crystal axes having three distinct indices of refraction. At 406, the polarizer is positioned between the crystal retarder and the spectrometer. The methodology 400 completes at 408.

With reference now to FIG. 5, an exemplary methodology 500 for characterizing an object through use of an athermal CSP is illustrated. The methodology 500 starts at 502, and at 504, an athermal CSP is configured to receive an EM signal that is subject to measurement. The athermal CSP includes at least one crystal retarder that is composed of a biaxial crystal. At 506, polarization states of the EM signal as a function of frequencies of the EM signal are determined. For example, the spectrometer of the athermal CSP can output a signal that is indicative of such polarization states. At 508, the object is characterized based upon the polarization states and the methodology 500 completes at 510.

Experimental Results

The experimental results referenced below are generated based upon the athermal CSP 100 shown in FIG. 1, with the crystal retarder 102 oriented with the B axis angularly offset by 45 degrees from the Y axis of the global coordinate system, but otherwise oriented as shown in FIG. 2, with thickness l=4.75 mm, $n_{AC}$=1.785, $n_B$=1.764, and the polarizer oriented to allow EM waves to pass therethrough with polarization direction parallel to the Y axis. The output of the polarizer 104 was focused into a fiber connected to a spectrometer operating over a spectral range of 200-11 nm with a spectral resolution of 0.44 nm.

Figure 6:
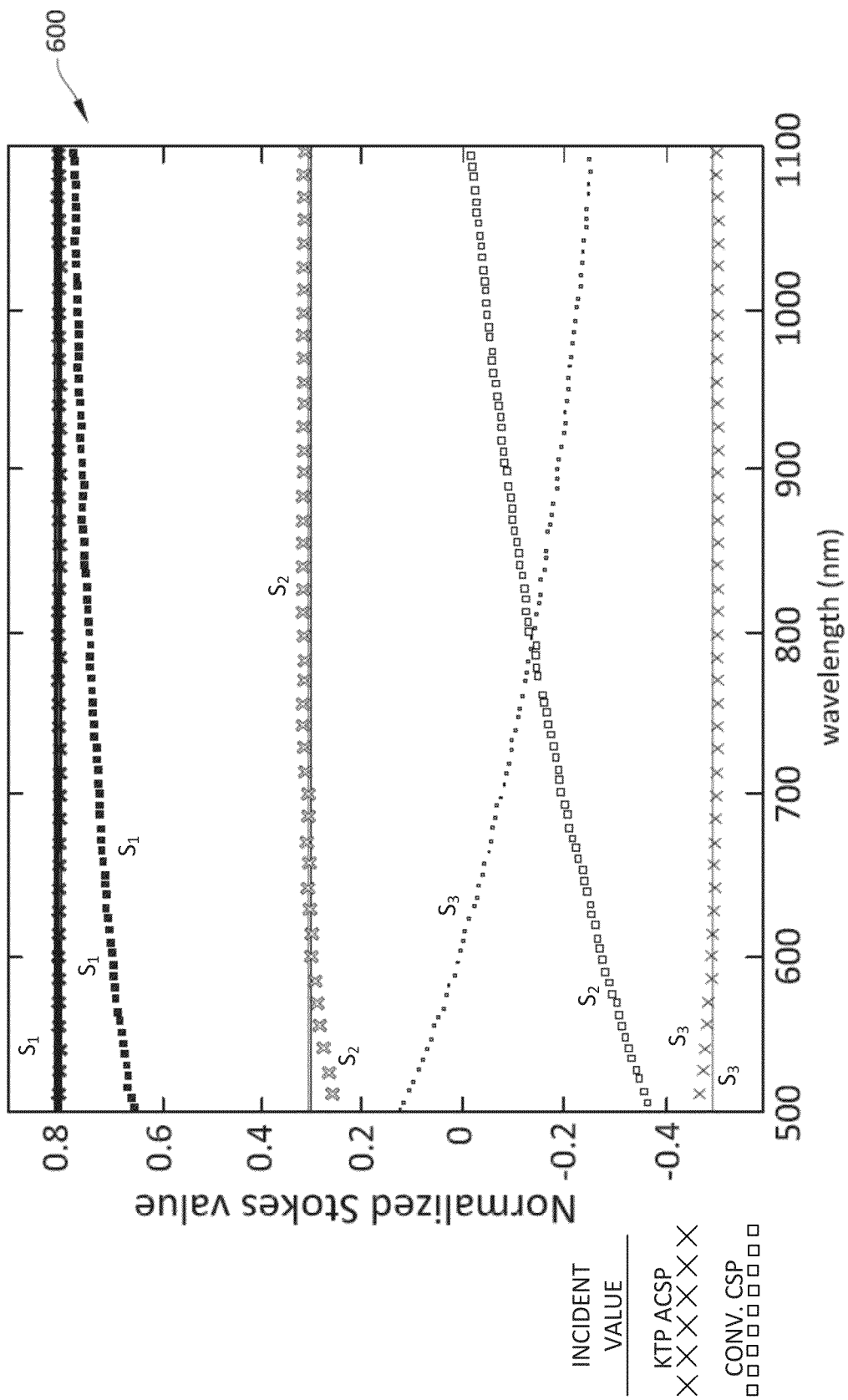
FIG. 6 illustrates thermally induced reconstruction errors in Stokes parameters across a particular frequency spectrum in a measurement output by a conventional CSP.

FIG. 6 is a graph 600 that illustrates simulated reconstruction errors in Stokes parameters $S_1$, $S_2$, and $S_3$ across the visible and near-infrared (VISNIR) frequency spectrum when a conventional CSP was employed to generate measurements using the calibration beam technique. Such reconstruction errors were caused by a 5° change in temperature between calibration and data acquisition.

Figure 7A:
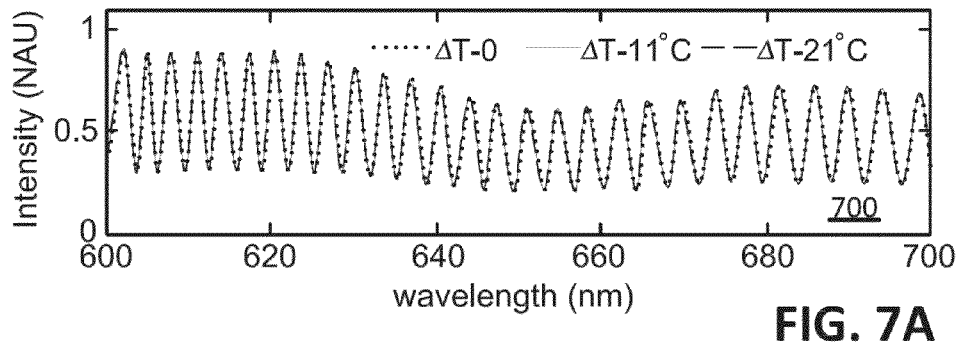
FIG. 7A illustrates simulated spectral data corresponding to an athermal CSP for various crystal retarder temperatures.
Figure 7B:
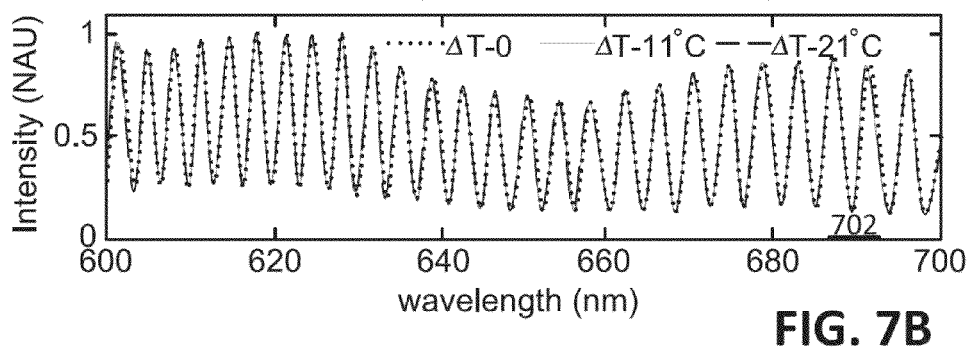
FIG. 7B illustrates experimental spectral data output by an athermal CSP for various crystal retarder temperatures.

FIGS. 7A and 7B include graphs 700 and 702 that depict simulated and experimental results, respectively, of the athermal CSP 100 configured as described above. The temperature of the crystal retarder 102 was varied by changing the temperature of a hotplate placed in close proximity thereto. Temperature monitoring was accomplished using two thermocouples placed along the border (non-imaging side) of the crystal retarder 102 approximately 180° apart. A quartz tungsten halogen (QTH) lamp was employed to provide collimated white light, and was used with a generating polarizer to create a known and stable input polarization state. Using an estimate of the QTH source spectrum, the graph 700 of FIG.

Figure 7C:
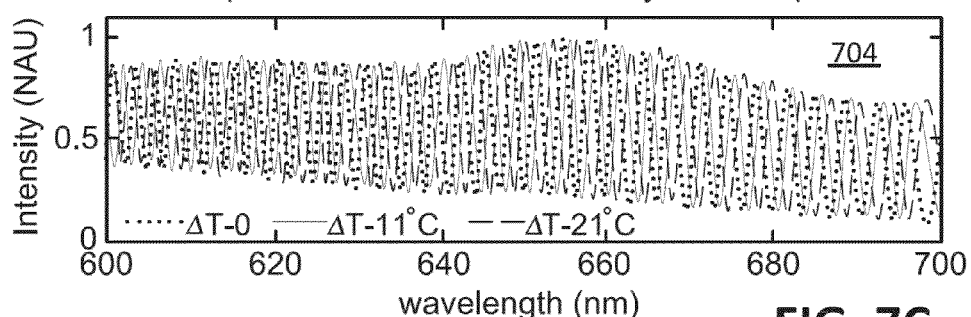
FIG. 7C illustrates experimental spectral data output by a CSP that comprises a crystal retarder formed of a biaxial crystal, wherein the crystal retarder is improperly oriented relative to the transmission axis of an electromagnetic signal being analyzed.

7A illustrates a simulation of the modulated spectra for three different crystal temperatures ranging from 21.4° C. to 42.4° C. The graph 702 of FIG. 7B depicts the experimentally measured spectra for the same conditions. In both cases, the frequencies of the modulations are invariant as a function of temperature, and therefore exhibit the desired temperature insensitive properties. Conversely, a graph 704 of FIG. 7C depicts simulated spectra for the scenario when $\theta=0°$ ($n_{AC}=n_B$). In the case shown in FIG. 7C, the amplitude modulating carrier frequency induced by the crystal retarder changes substantially as the temperature of the retarder is altered; accordingly, calibration using ambient temperature reference data would result in reconstruction errors (e.g., for the cases where the spectra were collected at temperatures differing from the temperature at which the reference data was acquired).

Figure 8:
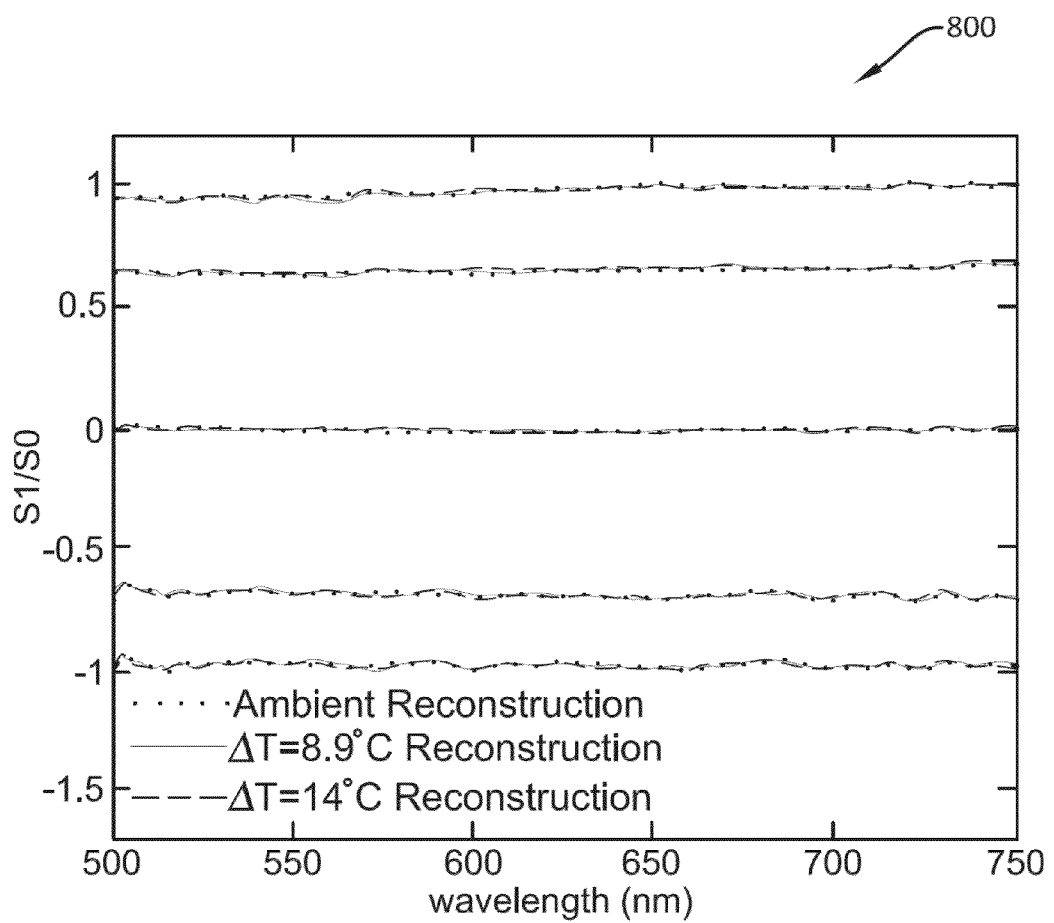
FIG. 8 illustrates exemplary reconstructions generated through use of an athermal CSP.

To quantify the thermally induced errors in reconstructed spectropolarimetric data products, the generating polarizer was used to produce different linear input polarization states ranging from horizontal (e.g., parallel to the Z axis)—

$$\left(0°, \frac{S_1}{S_0} = 1\right)$$

to vertical (parallel to the X axis)—

$$\left(90° \frac{S_1}{S_0} = -1\right)$$

in 22.5° increments. While the prototype was capable of measuring $S_3$, the generating polarizer only produced linear polarization states, and a measurement of $S_1$ was sufficient for demonstrating the concept of the athermal CSP 100. Each state was measured with the configuration referenced above, at the ambient temperature of 21.4° C. A reference polarization measurement at 157.5°

$$\left(\frac{S_1}{S_0} = 0.707\right)$$

was obtained at the ambient room temperature. Next, the crystal retarder 102 was heated to temperatures of 30.3° and 35.6° C. and two additional reference measurements were obtained. FIG. 8 includes a graph 800 illustrates that the reconstructed $S_1$ Stokes spectra over the $\lambda=500$-750 nm spectral range deviated by less than 1% RMS over a temperature increase of 14.2° C. Simulated results over the same spectral passband yielded a reconstruction error of 0.3% RMS.

The experiment was repeated for a series of temperatures ranging from 34.7° C. to 47.1° C. The RMS errors in the reconstructed $S_1$ values, when comparing the ambient and increased temperature reference measurements over $\lambda=500$-750 nm, are shown in Table 1 below. These results provide an initial quantification of the anticipated error for a given change in temperature for this type of system. For comparison, a simulated partial channeled spectropolarimeter using an equivalent quartz retarder yields a reconstruction error of 183% RMS for a temperature increase from 21.4° C. to 49.8° C.

| SOP | $\Delta T =$ 8.9° C. (%) | $\Delta T =$ 13.3° C. (%) | $\Delta T =$ 19.9° C. (%) | $\Delta T =$ 25.7° C. (%) |
|---|---|---|---|---|
| S1/S0 = 1.0 | 1.0 | 1.9 | 3.8 | 5.2 |
| S1/S0 = 0.7 | 0.6 | 1.4 | 2.9 | 3.8 |
| S1/S0 = 0.0 | 0.1 | 0.2 | 0.3 | 0.4 |
| S1/S0 = −0.7 | 0.6 | 1.8 | 3.5 | 4.6 |
| S1/S0 = −1.0 | 0.8 | 2.6 | 5.2 | 6.7 |

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An athermal channeled spectropolarimeter (CSP) comprising:
   a biaxial crystal retarder;
   a second biaxial crystal retarder, wherein the biaxial crystal retarder has a first thickness, the second biaxial crystal retarder has a second thickness, and wherein the first thickness is different from the second thickness;
   a polarizer; and
   a spectrometer that is in optical communication with the polarizer, wherein the biaxial crystal retarder and the polarizer are optically positioned in series such that a transmission axis of an electromagnetic (EM) signal passes through the biaxial crystal retarder and the polarizer, and wherein the second biaxial crystal retarder is optically in series with the biaxial crystal retarder and the polarizer such that the transmission axis of the EM signal passes through the biaxial crystal retarder, the second biaxial crystal retarder, and the polarizer.

2. The athermal CSP of claim 1, wherein the biaxial crystal retarder is composed of $KTiOPO_4$.

3. The athermal CSP of claim 1, the EM signal comprising frequencies in the near infrared spectrum.

4. The athermal CSP of claim 1, wherein the biaxial crystal retarder and the second biaxial crystal retarder are composed of $KTiOPO_4$.

5. The athermal CSP of claim 1, wherein the first thickness is greater than the second thickness.

6. The athermal CSP of claim 5, the second biaxial crystal retarder positioned between the biaxial crystal retarder and the analyzer.

7. The athermal CSP of claim 1, the spectrometer being a dispersive spectrometer.

8. The athermal CSP of claim 1, the spectrometer being a Fourier spectrometer.

9. An athermal channeled spectropolarimeter (CSP) comprising: a first biaxial crystal retarder having a first proximal surface and a first distal surface, the first biaxial crystal retarder comprising: a first crystal axis; a second crystal axis; and a third crystal axis, wherein the first crystal axis, the second crystal axis, and the third crystal axis are orthogonal to one another, the second crystal axis being parallel with the first proximal surface and the first distal surface, the first crystal axis forming an angle of 33.7 degrees relative to the first proximal surface and the first distal surface; a second biaxial crystal retarder positioned optically in series with the first biaxial crystal retarder, the second biaxial crystal retarder having a second proximal surface and a second distal surface, the second biaxial crystal retarder comprising: a fourth crystal axis; a fifth crystal axis; and a sixth crystal axis, wherein the fourth crystal axis, the fifth crystal axis, and the sixth crystal axis are orthogonal to one another, the fifth crystal axis being parallel with the second proximal surface and the second distal surface and angularly offset from the second crystal axis by 45 degrees, the fourth crystal axis forming an angle of 33°7 degrees relative to the second proximal surface and the second distal surface; a polarizer positioned optically in series with the second biaxial crystal retarder, the polarizer configured to allow electromagnetic waves having a polarization direction that is parallel to the second crystal axis to pass therethrough; and a spectrometer in optical communication with tile polarizer, the spectrometer receiving the electromagnetic waves that pass through the polarizer.

10. The athermal CSP of claim 9, wherein the first biaxial crystal retarder has a first thickness between the first proximal surface and the first distal surface, wherein the second biaxial crystal retarder has a second thickness between the second proximal surface and the second distal surface, and wherein the first thickness is different from the second thickness.

11. The athermal CSP of claim 9, wherein the biaxial crystal retarder is composed of $KTiOPO_4$.

12. The athermal CSP of claim 9, wherein the first crystal axis has a first index of refraction, the second crystal axis has a second index of refraction, and the third crystal axis has a third index of refraction, wherein the first index of refraction is less than the second index of refraction, and the second index of refraction is less than the third index of refraction.

13. The athermal CSP of claim 12, wherein the fourth crystal axis has the first index of refraction, the fifth crystal axis has the second index of refraction, and the sixth crystal axis has the third index of refraction.

14. The athermal CSP of claim 9, wherein the second biaxial crystal retarder has a thickness between the second proximal surface and the second distal surface of between 300 mm and 800 mm.

15. The athermal CSP of claim 9, the spectrometer being a dispersive spectrometer.

16. The athermal CSP of claim 9, the spectrometer being a Fourier spectrometer.

17. A method for forming an athermal channeled spectropolarimeter, the method comprising:
positioning a first biaxial crystal retarder optically in series with a second biaxial crystal retarder such that a transmission axis of an electromagnetic (EM) signal subject to measurement passes through the first biaxial crystal retarder and the second biaxial crystal retarder, the first biaxial crystal retarder having a first axis, the second biaxial crystal retarder having a second axis, the first axis offset from the second axis by 45 degrees;
positioning a polarizer optically in series with the first biaxial crystal retarder and the second biaxial crystal retarder such that the transmission axis passes through the polarizer, the second biaxial crystal retarder positioned between the first biaxial crystal retarder and the polarizer, wherein the polarizer is configured to allow EM waves to pass therethrough that have a polarization direction parallel to the first axis of the first biaxial crystal retarder; and
positioning a spectrometer optically in series with the polarizer.

18. The method of claim 17, wherein the biaxial crystal retarder is $KTiOPO_4$.

* * * * *